United States Patent [19]

Kade et al.

[11] Patent Number: 4,545,004
[45] Date of Patent: Oct. 1, 1985

[54] BRIDGE DRIVER CIRCUIT FOR A DC ELECTRIC MOTOR

[75] Inventors: Alexander Kade, Detroit; Thomas A. Radomski, Utica, both of Mich.

[73] Assignee: General Motors Corporation, Detroit, Mich.

[21] Appl. No.: 592,366

[22] Filed: Mar. 22, 1984

[51] Int. Cl.[4] .................................................. H02P 7/14
[52] U.S. Cl. ...................................... 363/63; 318/341; 318/379; 363/132
[58] Field of Search .................... 363/63, 98, 132; 312/341, 379, 597, 345 AB, 681

[56] References Cited

U.S. PATENT DOCUMENTS 3,110,851 11/1963 Plogstedt et al. .
3,233,161 2/1966 Sikorra .
3,776,111 12/1973 Maida ........................... 95/10 CD
4,275,340 6/1981 Schleupen ....................... 318/280
4,319,171 3/1982 Motoori ........................... 318/379

FOREIGN PATENT DOCUMENTS 160370 10/1982 Japan ............................... 363/132
864469 9/1981 U.S.S.R. .......................... 363/132

Primary Examiner—William H. Beha, Jr.
Attorney, Agent, or Firm—Mark A. Navarre

[57] ABSTRACT

A transistor bridge driver circuit having reduced operating losses, comprising a driver transistor connected to supply drive current to diagonally opposed bridge transistors and an auxiliary transistor effective when biased conductive to divert driver current away from one of the diagonally opposed bridge transistors. Switching losses are minimized because the bridge is operated in the one quadrant control mode and driver losses are minimized because one driver circuit controls the conduction of two diagonally opposed bridge transistors.

3 Claims, 13 Drawing Figures

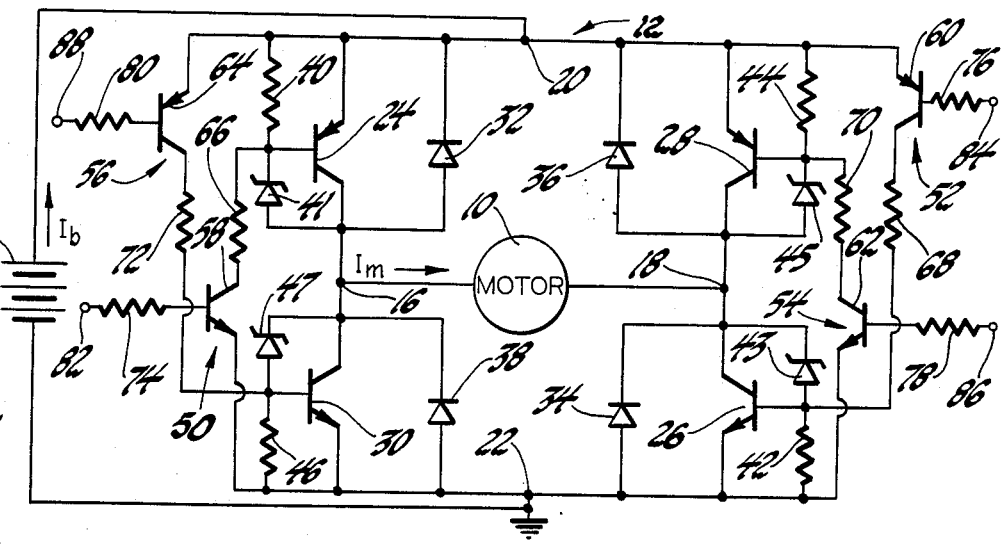
Fig. 1
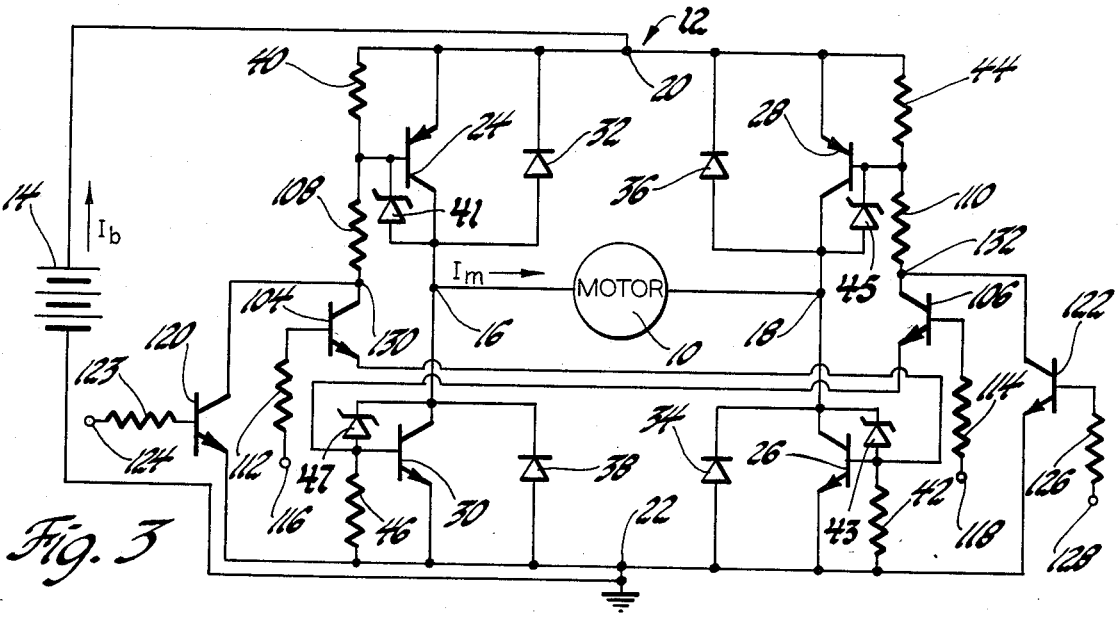
Fig. 2
Fig. 3

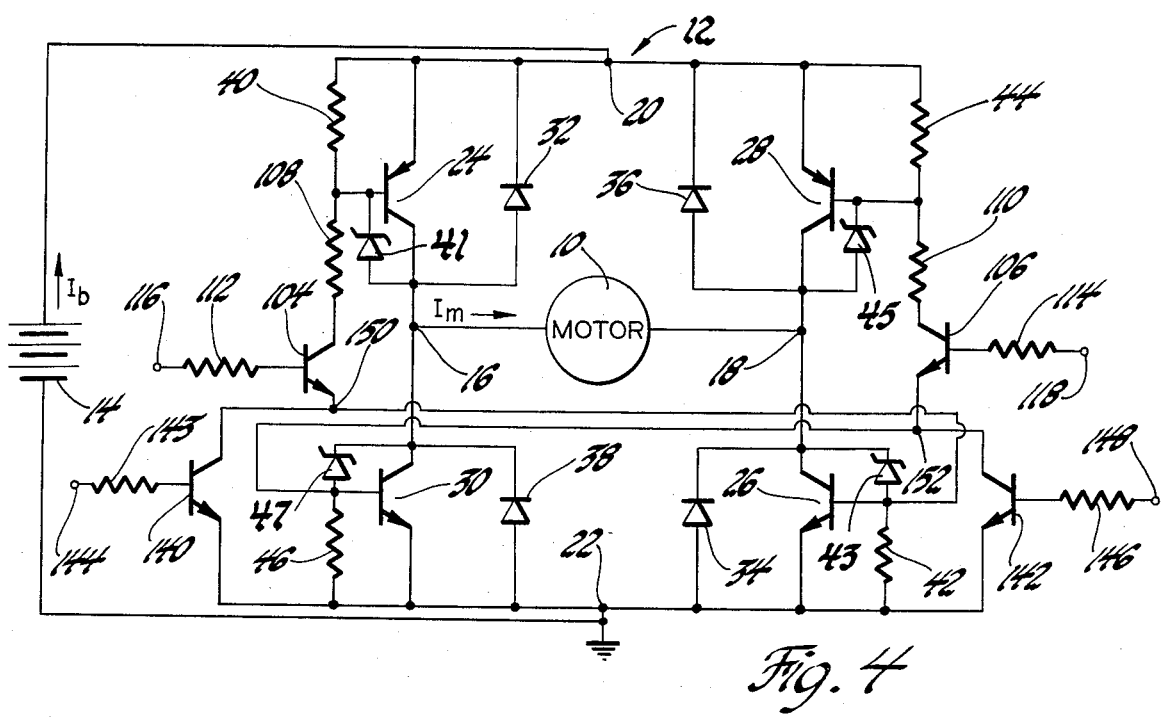
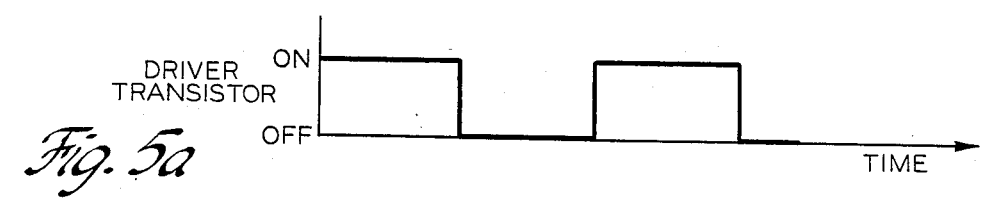
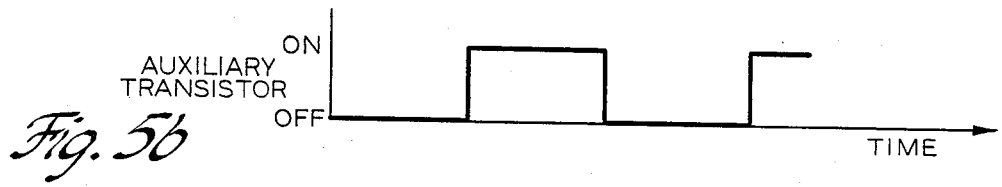
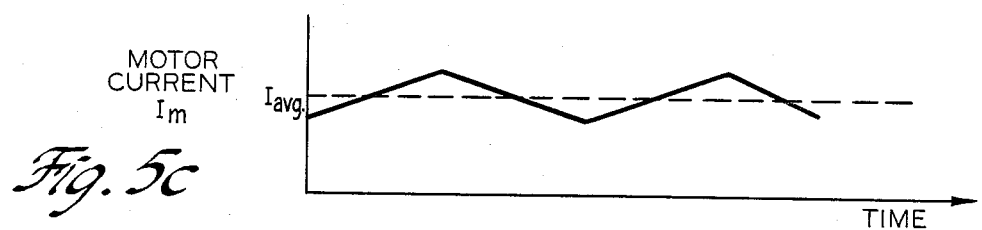
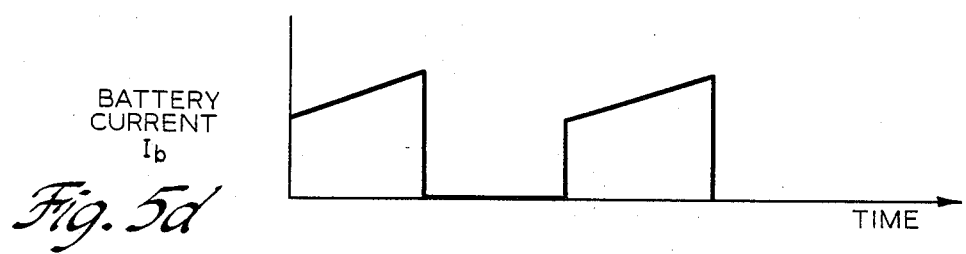

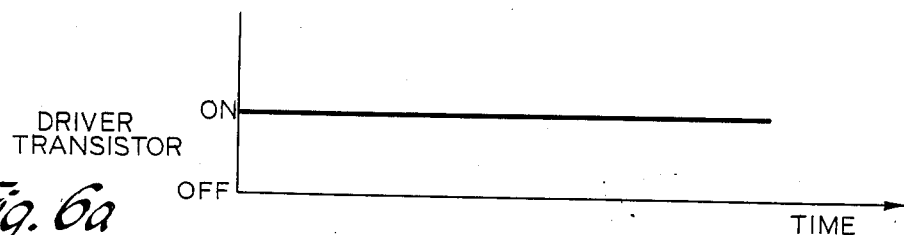
Fig. 6a
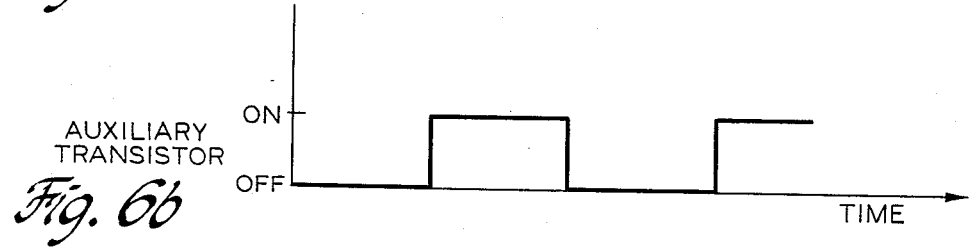
Fig. 6b
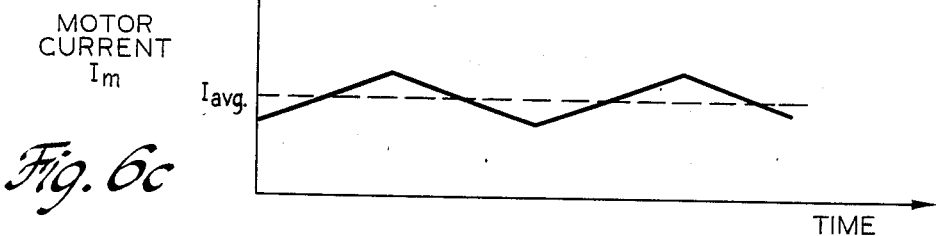
Fig. 6c
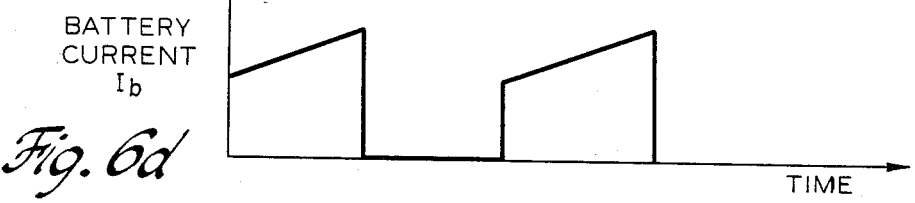
Fig. 6d
| DRIVER\LOSSES | TURN-ON | TURN-OFF | TOTAL | DRIVER | CONDUCTION | OVERALL |
|---|---|---|---|---|---|---|
| | SWITCHING | | | | | |
| FIG. 1 ONE QUADRANT | 4 W | 26 W | 30 W | 100 W | 150 W | 280 |
| FIG. 2 TWO QUADRANT | 25 W | 104 W | 129 W | 50 W | 150 W | 329 |
| FIG. 3 ONE QUADRANT | 4 W | 26 W | 30 W | 54 W | 150 W | 234 |
| FIG. 4 ONE QUADRANT | 4 W | 26 W | 30 W | 54 W | 150 W | 234 |
Fig. 7

BRIDGE DRIVER CIRCUIT FOR A DC ELECTRIC MOTOR

This invention relates to DC motor control and more particularly to transistor bridge driver circuitry.

BACKGROUND OF THE INVENTION

In motor control applications requiring forward and reverse motor rotation, a bridge circuit is generally used to supply current to the motor armature or field windings. In its basic configuration, the bridge circuit resembles an H, each leg of the bridge comprising a power switching device such as a power transistor. The motor winding is connected across one pair of opposing bridge terminals and a DC power source is connected across the other pair of opposing bridge terminals. Current of positive or negative polarity may be supplied to the motor to produce forward or reverse motor rotation by biasing one or the other pair of diagonally opposed power transistors conductive. Freewheeling diodes are connected across each leg of the bridge to protect the respective power transistor at turn-OFF by providing a shunt circuit path for inductive motor current.

Driver circuits are used to control the conduction of the bridge power transistors, and may operate the bridge in either the one quadrant control mode or the two quadrant control mode. In the one quadrant control mode, one of the power transistors is maintained conductive and the diagonally opposed power transistor is modulated conductive and nonconductive to effectively connect and disconnect the motor winding and the power source. Inductive current stored in the motor winding when the modulated transistor is biased nonconductive is circulated through the bridge via the conducting transistor and a freewheeling diode. Thus, the term "one quadrant control" indicates that the power source supplies current in one direction only. In two quadrant control, diagonally opposed power transistors are biased conductive and nonconductive in unison and inductive current stored in the motor winding when the power transistors are biased nonconductive is circulated through the power source via two freewheeling diodes. Thus, the term "two quadrant control" indicates that the power source supplies/accepts current in two directions.

In operating the motor, power losses are inherently incurred in both the driver circuits and the power transistors. One quadrant control results in relatively low switching losses in the power transistors, but relatively high driver losses since one driver circuit is provided for each power transistor. On the other hand, two quadrant control results in relatively high switching losses in the power transistors, but relatively low driver losses since a single driver circuit may be used to control two diagonally opposed power transistors.

SUMMARY OF THE INVENTION

The object of this invention is to provide drive circuitry for operating a power transistor bridge in the one quadrant control mode to take advantage of the relatively low switching losses associated therewith, while limiting the driver circuit losses substantially to those incurred with the two quadrant control mode. To achieve this object, the driver circuitry includes a driver transistor connected in a conventional two quadrant control configuration for supplying drive current to diagonally opposed power transistors, and an auxiliary transistor connected to the driver transistor for selectively rendering one of such power transistors nonconductive. As with the modulated power transistor in the conventional one quadrant control mode, the auxiliary transistor is modulated conductive and nonconductive to effectively connect and disconnect the motor winding and the power source. When the auxiliary transistor is biased nonconductive, the driver transistor is permitted to supply drive current to both diagonally opposed power transistors to effectively connect the motor winding to the power source. When the auxiliary transistor is biased conductive, it diverts drive current away from one of the diagonally opposed power transistors, thereby rendering such power transistor nonconductive to effectively disconnect the motor winding from the power source. The inductive current stored in the motor at the time of disconnection is circulated through the bridge via the conducting transistor and freewheeling diode. Relatively low switching losses are incurred since the bridge is operated in the one quadrant control mode, and relatively low driver losses are incurred since only one driver circuit is required for each pair of diagonally opposed power transistors.

IN THE DRAWINGS

FIG. 1 is a circuit diagram of a conventional power transistor bridge having a drive circuit for each power transistor.

FIG. 2 is a circuit diagram of a conventional power transistor bridge having a single drive circuit for each pair of diagonally opposed power transistors.

FIG. 3 is a circuit diagram of a power transistor bridge and drive circuit according to a first embodiment of this invention.

FIG. 4 is a circuit diagram of a power transistor bridge and drive circuit according to a second embodiment of this invention.

FIGS. 5a–5d are graphs depicting the operation of the power transistor bridge and drive circuit shown in FIG. 3. FIGS. 5a and 5b depict drive circuit control signals; FIG. 5c depicts the resulting motor current $I_m$; and FIG. 5d depicts the resulting battery current $I_b$.

FIGS. 6a–6d are graphs depicting the operation of the power transistor bridge and drive circuit shown in FIG. 4. FIGS. 6a and 6b depict drive circuit control signals; FIG. 6c depicts the resulting motor current $I_m$; and FIG. 6d depicts the resulting battery current $I_b$.

FIG. 7 is a table depicting the operating losses of the bridge circuits shown in FIGS. 1–4 for a given set of operating conditions.

Referring now more particularly to FIG. 1, the reference numeral 10 designates a DC electric motor winding. If the motor has a permanent magnet field, the winding 10 is the armature winding; if the motor has a wound field, the winding 10 is the field winding. A transistor bridge is generally designated by the reference numeral 12 and operates in a manner to be described to supply bi-directional current to motor winding 10 from a source of direct current such as battery 14. The bridge 12 is configured in the form of an H and is thus commonly referrred to as an H-switch. The motor winding 10 is connected across the bridge terminals 16 and 18, and the battery 14 is connected across the bridge terminals 20 and 22. Each leg of the bridge comprises a power transistor 24, 26, 28 or 30, a freewheeling diode 32, 34, 36 or 38 connected thereacross, and a pull-up or pull-down resistor 40, 42, 44 or 46 connected between the transistor base and emitter terminals. The upper power transistors 24 and 28 are of the PNP type and the pull-up resistors 40 and 44 associated therewith operate to bias the respective transistors nonconductive. The lower power transistors 26 and 30 are of the NPN type, and the pull-down resistors 42 and 46 operate to bias the respective transistors nonconductive. A zener diode 41, 43, 45, 47 connected across the base-collector junction of each power transistor 24, 26, 28, 30 protects the associated power transistor from damage due to inductive overvoltage at turn-OFF.

Each power transistor 24, 26, 28, 30 of the bridge 12 has a drive circuit 50, 52, 54 and 56 associated therewith for selectively biasing the respective power transistor conductive. Each drive circuit 50, 52, 54 and 56 comprises a driver transistor 58, 60, 62 and 64, a current limiting resistor 66, 68, 70 and 72, and an input resistor 74, 76, 78 and 80. The input resistor 74, 76, 78 and 80 of each driver circuit has a control terminal 82, 84, 86 or 88 connected thereto, and a logic control circuit (not shown) is provided for controlling the conduction of the respective driver transistors by applying suitable drive signals to the respective drive circuit control terminals. Thus, power transistor 24 is rendered conductive by biasing transistor 58 conductive through input terminal 82 and resistor 74. Similarly, the power transistors 26, 28 and 30 are rendered conductive by biasing the driver transistors 60, 62 and 64 conductive. In each case, the resistors 66, 68, 70 and 72 limit the driver current at a value which is sufficient to bias the respective power transistor 24, 26, 28 or 30 into saturation.

Current is supplied from battery 14 to the motor winding 10 through diagonally opposed power transistors of the bridge 12. Thus, current of the polarity designated by $I_m$ is supplied to the motor winding 10 by rendering both power transistors 24 and 26 conductive, and current of the opposite polarity is supplied to the motor winding 10 by rendering both power transistors 28 and 30 conductive. Current of one polarity produces forward motor rotation and current of the opposite polarity produces reverse motor rotation.

The transistor bridge 12 of FIG. 1 may be operated in either the one quadrant control mode or the two quadrant control mode. In the one quadrant control mode, one of the power transistors is maintained conductive and the diagonally opposed power transistor is modulated conductive and nonconductive. For example, to supply current to the motor winding 10 of the polarity designated by $I_m$, power transistor 24 is maintained conductive and the power transistor 26 is modulated conductive and nonconductive. When both transistors 24 and 26 are conductive, the bridge 12 provides a current path from battery 14 to the motor winding 10 through the emitter-collector circuits of the transistors 24 and 26. When transistor 26 is subsequently biased nonconductive, the inductive current stored in the motor winding 10 is circulated through a circuit path including the motor winding, the freewheeling diode 36 and the emitter-collector circuit of transistor 24. Alternately, of course, one quadrant control may be achieved by maintaining the power transistor 26 conductive and modulating the power transistor 24 conductive and nonconductive. In such case, the inductive current stored in the motor winding 10 when transistor 24 is biased nonconductive is circulated through a current path comprising the motor winding 10, the collector-emitter circuit of power transistor 26 and the freewheeling diode 38. The above discussion equally applies to the control of power transistors 28 and 30 when it is desired to supply the motor winding 10 with current of the opposite polarity. In two quadrant control, diagonally opposed power transistors are biased conductive and nonconductive in unison. Thus, to supply the motor winding 10 with current of the polarity designated by $I_m$, the power transistors 24 and 26 are modulated conductive and nonconductive in unison. When both transistors 24 and 26 are conductive, the battery 14 supplies current to motor winding 10 through the emitter-collector circuits of power transistors 24 and 26. When the power transistors 24 and 26 are subsequently biased nonconductive, the inductive current stored in the motor winding 10 is circulated through the battery 14 via the freewheeling diodes 36 and 38. The above discussion equally applies to the control of power transistors 28 and 30 when it is desired to supply motor winding 10 with current of the opposite polarity. In such case, the inductive current stored in the winding 10 when the power transistors 28 and 30 are biased nonconductive is circulated through battery 14 via the freewheeling diodes 32 and 34. Thus, the term "one quadrant control" indicates that battery 14 supplies current in one direction and the term "two quadrant control" indicates that battery 14 supplies/accepts current in two directions.

In operating the bridge circuit as described above, some power is inherently dissipated in the bridge and driver circuits. Since such power does not contribute to the motor energy, it is considered as a loss and preferably should be minimized. The bridge circuit power losses essentially consist of switching losses and conduction losses in the power transistors 24, 26, 28 and 30. Switching losses are significantly higher for the two quadrant control mode than for the one quadrant control mode since the two quadrant control mode requires a reversal of current through the battery 14 whenever the respective power transistors turn ON or turn OFF. At such times, stray or leakage inductance in the battery and its cables slows the switching, thereby causing the transistors to operate at an unsaturated current level for a longer period of time than would otherwise be expected. Conduction losses are about the same for the one and two quadrant control modes when the bridge is operated at a near unity duty cycle, as good design practice would dictate for most applications. The driver power losses occur primarily in the current limiting resistors 66, 68, 70 and 72. As such, the total amount of driver loss is substantially a direct function of the number of driver circuits required. The arrangement shown in FIG. 1, incurs a relatively large amount of driver loss since a separate driver circuit 56, 58, 60 or 62 is required for each power transistor. When the two quadrant control mode is used, the driver loss can be substantially halved by using the arrangement depicted in FIG. 2. In such arrangement, one driver circuit is provided for each pair of diagonally opposed power transistors since such transistors are to be biased conductive and nonconductive in unison. Thus, in FIG. 2, the conduction of power transistors 24 and 26 is controlled by the driver circuit 100 and the conduction of power transistors 28 and 30 is controlled by the driver circuit 102. Each driver circuit 100 and 102 comprises a driver transistor 104, 106, a current limiting resistor 108, 110, and an input resistor 112, 114. Each input resistor 112 and 114 has a control terminal 116, 118 connected thereto and a logic control unit (not shown) is provided for applying suitable control signals thereto for controlling the conduction of the driver transistors 104 and 106. Thus, the power transistors 24 and 26 are rendered conductive to supply the motor winding 10 with current of the polarity designated by $I_m$ by applying a positive control signal to control terminal 116 to bias driver transistor 104 conductive. In such case, the drive current circuit path comprises the emitter-base circuit of power transistor 24, resistor 108, the collector-emitter circuit of driver transistor 104 and the base-emitter circuit of power transistor 26. Power transistors 28 and 30 are biased into conduction by applying a positive control signal to control terminal 118 for biasing the driver transistor 106 into conduction. In such case, the drive current circuit path for power transistors 28 and 30 includes the emitter-base circuit of power transistor 28, current limiting resistor 110, the collector-emitter circuit of driver transistor 106 and the base-emitter circuit of power transistor 30.

According to this invention, a transistor bridge is operated in the one quadrant control mode to take advantage of the relatively low power transistor switching losses associated therewith, and a novel drive circuit arrangement limits the driver losses substantially to those incurred in the two quadrant mode drive circuit arrangement depicted in FIG. 2. As a result, the overall bridge and driver losses (operating losses) are significantly reduced, as compared to the conventional drive circuit arrangements depicted in FIGS. 1 and 2. This effect is achieved with the drive circuit arrangement depicted in FIG. 2 by the addition of an auxiliary transistor connected to each driver transistor 104 and 106. Each auxiliary transistor is selectively actuable to divert drive current away from one of the respective power transistors 26, 30 thereby rendering such power transistor nonconductive. According to a first embodiment of this invention (FIG. 3), the auxiliary transistor is connected to the collector of the respective driver transistor; according to a second embodiment of this invention (FIG. 4), the auxiliary transistor is connected to the emitter of the respective driver transistor. In either embodiment, the auxiliary transistor is modulated conductive and nonconductive to effectively connect and disconnect the motor winding 10 and the battery 14. Inductive current stored in the motor winding 10 at the time of disconnection from battery 14 is circulated through the bridge 12 via the conducting transistor and a freewheeling diode. Relatively low switching losses are incurred since the bridge is operated in the one quadrant control mode, and relatively low driver losses are incurred since only one driver circuit is required for each pair of diagonally opposed power transistors.

Referring now more particularly to FIG. 3, the auxiliary transistors are designated by the reference numerals 120 and 122. The base of auxiliary transistor 120 is connected through an input resistor 123 to an input terminal 124, and the base terminal of auxiliary transistor 122 is connected through input resistor 126 to input terminal 128. The remaining components depicted in FIG. 3 are essentially the same as those depicted in FIG. 2 and have been assigned corresponding reference numerals.

The collector-emitter circuit of auxiliary transistor 120 is connected between the bridge terminal 22 and a junction 130 between current limiting resistor 108 and the collector terminal of the driver transistor 104. The collector-emitter circuit of auxiliary transistor 122 is connected between the bridge terminal 22 and the junction 132 between the current limiting resistor 110 and the collector of driver transistor 106. When the driver transistor 104 is biased conductive and the auxiliary transistor 120 is biased nonconductive, the driver transistor 104 is effective to bias the diagonally opposed power transistors 24 and 26 conductive as described above in reference to FIG. 2. When biased conductive, the auxiliary transistor 120 provides an independent drive current path for the power transistor 24 and diverts drive current away from the power transistor 26. During such operation, the driver transistor 104 preferably should be biased nonconductive to reduce driver losses and to ensure that power transistor 26 is biased OFF. The other side of the bridge is operated in a similar manner. Thus when driver transistor 106 is biased conductive and the auxiliary transistor 122 is nonconductive, the driver transistor 106 is effective to bias power transistors 28 and 30 conductive as described above in reference to FIG. 2. However, when driver transistor 106 is biased nonconductive and auxiliary transistor 122 is biased conductive, the auxiliary transistor 122 independently establishes a drive current circuit path for the power transistor 28 and diverts drive current from the power transistor 30.

Suitable control signals for the driver transistors 104 and 106 and the auxiliary transistors 120 and 122 are depicted in FIGS. 5a and b, respectively. FIG. 5c depicts the resulting motor current $I_m$ and FIG. 5d depicts the resulting battery current $I_b$. As indicated in the above figures, a pulsed motor current of the polarity indicated by $I_m$ in FIG. 3 is established through the motor winding 10 by alternately modulating the driver transistor 104 and the auxiliary transistor 120 conductive and nonconductive. When the auxiliary transistor 120 is nonconductive, the driver transistor 104 establishes a drive current circuit path for both power transistors 24 and 26, effectively connecting the motor winding 10 across battery 14. When the auxiliary transistor 120 is rendered conductive by the application of a positive voltage potential to its input terminal 124, the junction 130 is effectively lowered to near ground potential, biasing power transistor 24 conductive and diverting drive current away from the power transistor 26. As a result, the motor winding 10 is effectively disconnected from battery 14 and inductive current stored in the motor winding 10 is circulated through a circuit path comprising the motor winding 10, the freewheeling diode 36 and the emitter-collector circuit of the power transistor 24. Thus, in the period of disconnection, the motor current continues in the direction designated by $I_m$ as seen in FIG. 5c and the battery current falls substantially to zero as seen in FIG. 5d. It will be recognized, of course, that the above discussion equally applies to the control of driver transistor 106 and auxiliary transistor 122 when it is desired to supply the motor winding 10 with current of the opposite polarity to that designated by $I_m$. In such case, FIG. 5a would depict the conduction of driver transistor 106 and FIG. 5b would depict the conduction of auxiliary transistor 122. Since the drive circuit depicted in FIG. 3 operates the bridge 12 in the one quadrant control mode, the switching losses incurred in the power transistors 24, 26, 28 and 30 are relatively low and substantially equal to those incurred with the driver circuit depicted in FIG. 1 during one quadrant operation. Moreover, the driver losses incurred with the driver arrangement of FIG. 3 are substantially the same as those incurred in the driver circuit of FIG. 2, since one driver circuit controls conduction of two diagonally opposed power transistors. Viewed in this way, the driver circuit according to the first embodiment of this invention comprises a driver transistor 104, 106 and its input resistor 112, 114, a current limiting resistor 108, 110, an auxiliary transistor 120, 122, and its input resistor 123, 126.

Referring now more particularly to FIG. 4 and the second embodiment of this invention, the auxiliary transistors are designated by the reference numerals 140 and 142. The base of auxiliary transistor 140 is connected through an input resistor 143 to an input terminal 144, and the base terminal of auxiliary transistor 142 is connected through input resistor 146 to input terminal 148. The remaining components depicted in FIG. 4 are essentially the same as those depicted in FIG. 2 and have been assigned corresponding reference numerals.

The collector-emitter circuit of auxiliary transistor 140 is connected between the bridge terminal 22 and a junction 150 between the emitter of driver transistor 104 and the base terminal of power transistor 26. The collector-emitter circuit of auxiliary transistor 142 is connected between the bridge terminal 22 and a junction 152 between the emitter terminal of driver transistor 106 and the base terminal of power transistor 30. When driver transistor 104 is biased conductive and the auxiliary transistor 140 is biased nonconductive, the driver transistor 104 is effective to bias the diagonally opposed power transistors 24 and 26 conductive as described above in reference to FIG. 2. When both the driver transistor 104 and the auxiliary transistor 140 are biased conductive, the auxiliary transistor 140 diverts driver current away from the base terminal of power transistor 26, to deenergize motor winding 10, and the inductive motor current is circulated through power transistor 24. Similarly, when driver transistor 106 is biased conductive and the auxiliary transistor 142 is nonconductive, the driver transistor 106 is effective to bias power transistors 28 and 30 conductive as described above in reference to FIG. 2. When both the driver transistor 106 and the auxiliary transistor 142 are biased conductive the auxiliary transistor 142 diverts drive current away from the base of power transistor 30 to deenergize motor winding 10, and the inductive motor current is circulated through power transistor 28.

Thus, current of the polarity designated by $I_m$ is supplied to the motor winding 10 by maintaining the driver transistor 104 conductive and modulating the auxiliary transistor 140 conductive and nonconductive. Current of the opposite polarity is supplied to the motor winding 10 by maintaining the driver transistor 106 conductive and modulating the auxiliary transistor 142 conductive and nonconductive. Suitable control signals for the driver transistors 104, 106 and auxiliary transistors 140, 142 are depicted in the graphs of FIGS. 6a and 6b. FIG. 6c depicts the resulting motor current $I_m$ and FIGS. 6d depicts the resulting battery current $I_b$. It will be noted that the FIGS. 6c and 6d are identical to the FIGS. 5c and 5d, respectively. Since the drive circuit depicted in FIG. 4 operates the bridge 12 in the one quadrant control mode, the switching losses are substantially equal to those incurred with the driver circuit depicted in FIG. 1 during one quadrant operation. In addition, the driver losses incurred with the driver arrangement of FIG. 4 are substantially the same as those incurred with the driver arrangement of FIG. 2 since one driver circuit controls the conduction of two diagonally opposed power transistors. Viewed in this way, the driver circuit according to the second embodiment of this invention comprises a driver transistor 104, 106 and its input resistor 112, 114, a current limiting resistor 108, 110, an auxiliary transistor 140, 142 and its input resistor 143, 146.

To quantify the operating loss improvement of the driver circuits of this invention, the table of FIG. 7 gives the switching, conduction and driver losses in Watts (W) incurred by the circuits depicted in FIGS. 1–4 for an operating condition wherein the motor winding 10 is supplied with an average current $I_{avg}$ of 75 amperes and wherein the battery 14 is a conventional 12-volt lead-acid storage battery, and zener diodes 41, 43, 45 and 47 have a breakdown voltage of 27 V. In addition, the losses given in the table assume a battery and cable inductance of 1.5 $\mu$h. Predriver losses have been neglected due to their relatively small magnitudes.

It will be understood that various terms used herein, such as power transistor, have been used in order to provide a clear understanding of this invention and do not necessarily refer to a specific class of devices. In this vein, it should also be understood that various modifications to the illustrated embodiments may occur to those skilled in the art and that driver circuits incorporating such modifications may fall within the scope of this invention which is defined by the appended claims.

The embodiments of the invention in which an exclusive property or privilege is claimed are defined as follows:

1. For a DC motor controller of the bridge circuit type including a motor connected across one pair of opposing bridge terminals and a source of direct current connected across the other pair of opposing bridge terminals, two pairs of power transistors, the transistors of each such pair being connected in diagonally opposed legs of the bridge such that the motor is energized with current from the source in one direction when both transistors of one pair are biased conductive and in the opposite direction when both transistors of the other pair are biased conductive, and a driver transistor for each pair of power transistors, each such driver transistor being effective (1) when biased conductive to supply drive current to both transistors of the associated power transistor pair for biasing both such transistors conductive with a minimum amount of driver loss, and (2) when subsequently biased nonconductive to interrupt the supply of drive current to both transistors of such power transistor pair, thereby rendering both power transistors thereof nonconductive to interrupt motor energization, whereafter inductive current stored in said motor is reversed through said source, the improvement comprising:

an auxiliary transistor for each of said driver transistors, each such auxiliary transistor being effective (1) when nonconductive to permit the respective driver transistor to supply drive current to both transistors of the associated power transistor pair for biasing both such transistors conductive with a minimum amount of driver loss, and (2) when biased conductive to divert drive current away from one transistor of the associated power transistor pair, rendering such one transistor nonconductive to interrupt motor energization, whereafter inductive current stored in the motor is circulated through the other transistor of said power transistor pair instead of said source, thereby to avoid the power transistor switching losses occasioned by the reversal of current through said source.

2. A DC motor controller of the bridge circuit type including a motor connected across one pair of opposing bridge terminals and a source of direct current connected across the other pair of opposing bridge terminals, two pairs of power transistors, each comprising a PNP transistor connected in an upper leg of the bridge and an NPN transistor connected in a lower diagonally opposed leg of the bridge such that the motor is energized with current from the source in one direction when both transistors of one pair are biased conductive, and in the other direction when both transistors of the other pair are biased conductive, a freewheeling diode connected across the collector-emitter circuit of each power transistor, and a driver transistor for each of said power transistor pairs, each such driver transistor being connected between the base terminals of the respective power transistors and effective (1) when biased conductive to supply drive current to both transistors of the associated power transistor pair for biasing such transistors conductive with a minimum amount of driver loss, and (2) when subsequently biased nonconductive to interrupt the supply of drive current to both transistors of such power transistor pair, thereby rendering both such transistors nonconductive to interrupt motor energization, whereafter inductive current stored in said motor is reversed through said source via a pair of said freewheeling diodes, the improvement comprising:

an auxiliary transistor for each of said driver transistors, each such auxiliary transistor being connected between the emitter terminal of the respective NPN power transistor and a point between the respective driver transistor and the base terminal of the respective PNP power transistor, the auxiliary transistor being effective (1) when biased nonconductive to permit the respective driver transistor to supply drive current to both transistors of the respective power transistor pair with a minimum amount of driver loss, and (2) when biased conductive to divert drive current away from the base terminal of the NPN power transistor, rendering such NPN power transistor nonconductive to interrupt motor energization, whereafter inductive current stored in the motor is circulated through the PNP transistor and a freewheeling diode instead of said source, thereby to avoid the power transistor switching losses occasioned by the reversal of current through said source.

3. A DC motor controller of the bridge circuit type including a motor connected across one pair of opposing bridge terminals and a source of direct current connected across the other pair of opposing bridge terminals, two pairs of power transistors, each comprising a PNP transistor connected in an upper leg of the bridge and an NPN transistor connected in a lower diagonally opposed leg of the bridge such that the motor is energized with current from the source in one direction when both transistors of one pair are biased conductive, and in the other direction when both transistors of the other pair are biased conductive, a freewheeling diode connected across the collector-emitter circuit of each power transistor, and a driver transistor for each of said power transistor pairs, each such driver transistor being connected between the base terminals of the respective power transistors and effective (1) when biased conductive to supply drive current to both transistors of the associated power transistor pair for biasing such transistors conductive with a minimum amount of driver loss, and (2) when subsequently biased nonconductive to interrupt the supply of drive current to both transistors of such power transistor pair, thereby rendering both such transistors nonconductive to interrupt motor energization, whereafter inductive current stored in said motor is reversed through said source via a pair of said freewheeling diodes, the improvement comprising:

an auxiliary transistor for each of said driver transistors, each such auxiliary transistor being connected between the emitter and base terminals of the respective NPN power transistor, the auxiliary transistor being effective (1) when biased nonconductive to permit the respective driver transistor to supply drive current to both transistors of the respective power transistor pair with a minimum amount of driver loss, and (2) when biased conductive to divert drive current away from the base terminal of the NPN power transistor, rendering such NPN transistor nonconductive to interrupt motor energization, whereafter inductive current stored in the motor is circulated through the PNP transistor and a freewheeling diode instead of said source, thereby to avoid the power transistor switching losses occasioned by the reversal of current through said source.

* * * * *